Patented Jan. 31, 1950

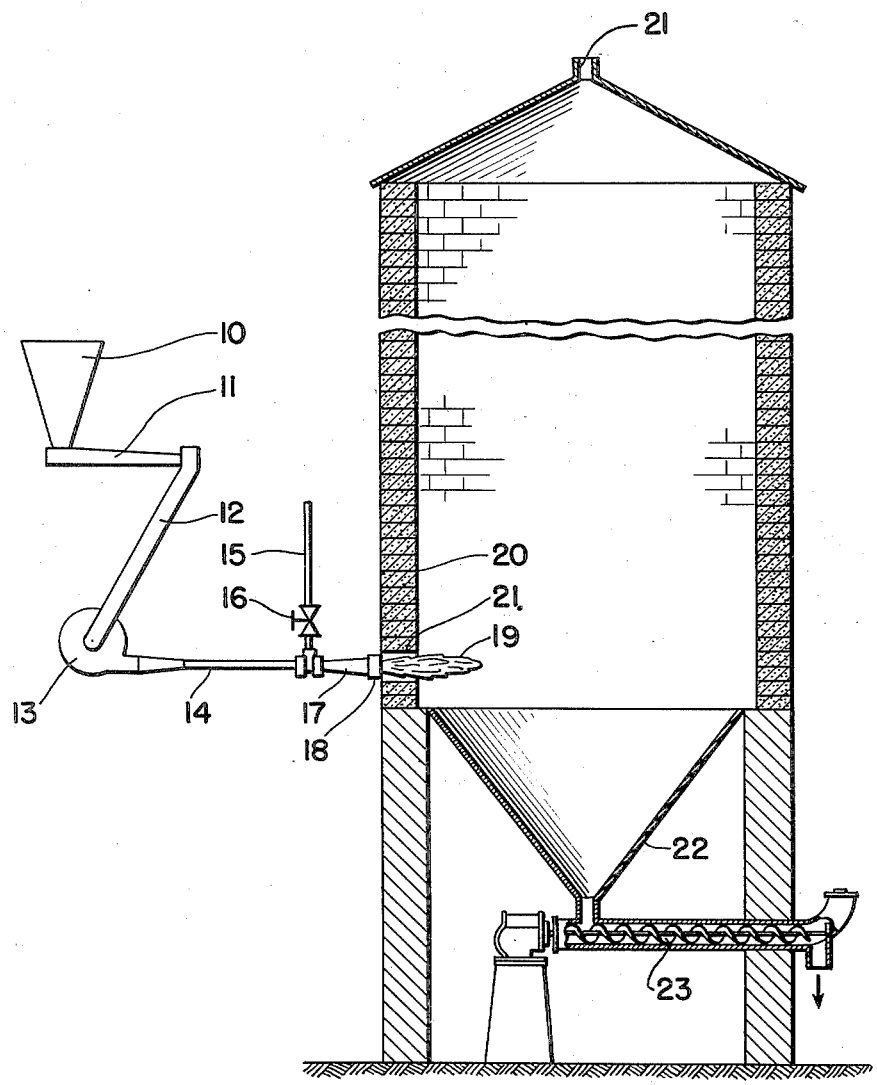
INVENTORS:
Einar P. Flint
Thomas C. Miller
Wilson F. Douglass

2,496,203

UNITED STATES PATENT OFFICE 2,496,203

BENEFICIATION OF VOLCANIC ASH

Einar P. Flint and Thomas C. Miller, Chicago, Ill., and Wilson F. Douglass, South Omaha, Nebr., assignors to The Cudahy Packing Company, Chicago, Ill., a corporation of Maine Application May 10, 1948, Serial No. 26,084

5 Claims. (Cl. 252—378)

This application is a continuation-in-part of our co-pending application, Serial No. 740,346, filed April 9, 1947, now abandoned.

This invention relates to the beneficiation treatment of lava ash (pumicite), pumice, and the like volcanic siliceous glass, in pulverulent condition and while containing bound water, and to the production therefrom of material of improved character and quality and of enhanced utility.

Pumice and pumicite or lava ash have heretofore been used as scouring agents in household or other cleansing compositions in natural condition, that is, without pre-treatment other than that of ordinary drying to remove free and adsorbed or occluded moisture, and pulverization, if necessary. Most of the formations of lava ash, however, occur in naturally pulverulent condition and only require mere crushing and drying of caked lumps as mined. These materials, as heretofore generally employed, are in the form of minute irregular fragments of natural glass of abrasive character. While composed largely of silica with appreciable quantities of alumina, iron is also present in relatively small amounts, largely as ferric oxide. These materials are normally of a gray color, and when wet with water, for example when used as a cleansing agent or component, assume a dirty brown color. Although the iron content of these materials is small, it has been found that their ferric oxide content is largely responsible for such color character, and these colors have been considered to be undesirable in household cleansing compositions.

These materials are also characterized by their ability to swell and expand on sudden heat treatment at their softening or plasticizing temperature ranges due, it is believed, to their natural content of what has been termed "bound" water or water of constitution, as distinguished from mere surface or occluded moisture content. This may also be described as "loss on ignition," and may be determined by loss of weight of a sample slowly heated to a temperature of 1,000° C. until no further loss of weight occurs. Although composed in part of organic material and carbon dioxide from carbonates in the sample, this ignition-loss is composed essentially of water dissolved in the volcanic glass and may comprise from 2% to 7%, although it averages about 4-5% in lava ash.

It has heretofore been proposed to treat lava ash and similar material in pulverulent condition, for use in cleansing compositions, by first pre-heating the material to about 800° C. and then subjecting the particle material, in disseminated condition, to a fusing or above-fusing temperature to globularize, solidify and densify the particles. We have found such material to be unsuited for use in cleansing compositions, due to the fact that the pre-heat treatment removed the bound water and prevented the particles from subsequently expanding, and the further heating to fusing temperature or above produced smooth solid glass spheres, which properties nullified not only the original useful character of the material but deprived it of any abrasive and all absorptive or adsorptive character necessary in a cleansing agent.

It has also been heretofore proposed to heat-treat these volcanic glasses to enhance their properties for structural or other industrial uses by feeding a stream of finely-divided material of the class described into a firing tube at a point intermediate a burner and a furnace inlet adjacent the top of a vertically-extending furnace, and to maintain the particles therein in turbulent condition and at a plasticizing temperature by means of the flame passing spirally through the furnace for sustained periods, before discharge from the base of the furnace. Although such process is directed to expansion or puffing of the particles, the sustained heat treatment in a circuitous path throughout the furnace, even though below actual fusing temperature, is conducive to sealing of the formed pores and glazing or annealing of the particle surfaces with the production of a high percentage of glazed, spherical, relatively strong walled, although expanded particles. While considered by some to be desirable for other uses, such material is not as desirable for uses, such as in cleansing compositions, as is our material of the present invention since traverse, either in a direct or circuitous path through an elongated heating or expansion zone, is conducive to sealing of voids or cells and surface glazing and the like, which we do not desire.

It is an object of our invention to improve the character of volcanic siliceous glass of the class described, and to render it particularly suitable for use in cleansing compositions by improving the scouring and dirt-collecting properties thereof and modifying the structure thereof so as to make possible greater adsorption and absorption or soaking up of dirt and grease.

A further object is to improve the color of these materials by modifying the refractive index and to increase the reflectivity and color balance of the particles thereof.

A further object is to improve the color of these materials so as to cause them to be lighter or whiter in both the dry and wet states by reduction of ferric oxide content to ferrous oxide.

In general, our process comprises subjecting these glasses to sudden thermal treatment to obtain maximum expansion and material of greatly increased surface area, while preventing glazing, vitrification and sealing of bubbles or void spaces formed by expansion, by avoiding annealing or heat soaking, within a furnace or kiln for sustained periods. The resultant product is one of greatly reduced bulk density, of white character, and of a highly porous "sponge-like" vesicular friable nature, composed in major amount of expanded and fractured particles of the original material.

More specifically, our process comprises dispersing and suspending the material, in pulverulent form, in a combustible gas-air stream and ejecting it under pressure through the flame of a burner, in a horizontal direction, into a stack or flue adjacent the base thereof, whereby the particle material is subjected to the sudden heat of the flame through which it passes co-currently at a softening or plasticizing, but below fusing temperature, and is promptly permitted to precipitate and drop by gravity out of the flame zone to discharge and collection therefrom. This brief momentary treatment which comprises a fraction of a second through a flame and no more than a few seconds for complete discharge, while being adequate to bring about high expansion, is inadequate to glaze, anneal the particle surfaces or to close up the formed pores, but is rather conducive to bursting of formed bubbles or spherical material, either by popping under the release and vaporization of the bound water without adequate heat and time for fusing and glazing, or fracturing of bubbles by impact of the particles against one another or collapse of their thin walls on prompt cooling by resulting vacuum formed in any sealed or previously unburst cells.

The resulting particle material is thus composed largely of, for example, 75% or more fractured shell-like particles of low density, and of greatly increased surface area due to the fragmentation thereof. Due to the action of the flame treatment under reducing conditions, the ferric oxide content is converted to ferrous oxide with attendant elimination of the described gray and brown color-inducing factor. Further brightness and whiteness are brought about by reason of the increased surface area and vesicular nature of the material, due to both expansion and fracture, providing enhancement of the refractive index, reflectivity and color balance of the particles. Although this treatment reduces the abrasive character of the original material, due to its enhanced porosity and modified structure, its character as a cleansing agent or component is materially altered and increased, making possible greater adsorption and absorption and soaking up of dirt and grease.

Other objects and advantages, including the details and economies of our invention, will be apparent from consideration of the following specification and accompanying drawing which diagrammatically illustrates a means for accomplishing the objects of our invention.

Referring to the drawing, the volcanic siliceous glass material to be treated is fed from hopper 10 at a regulated rate by means of the vibratory feeder 11 to the open slide 12 and into the blower 13. The material is introduced in pulverulent condition, that is in either the natural pulverulent condition of most varieties of volcanic ash, aided by crushing of lumps where necessary, or by pulverizing in suitable apparatus for other varieties or for other similiar materials, such as pumice. Also, the material to be treated is conventionally subjected to pre-drying at a temperature, such as 100–190° C., to remove surface or occluded moisture, but not to remove any, or any appreciable portion of bound water.

The action of the blower 13 serves to entrain and disseminate the particle material in an air stream and feeds it under pressure through line 14 into which combustible gas is introduced through line 15 and valve 16. The gas may be natural or manufactured gas, hydrogen, propane, or the like and mixtures thereof. Here the particle-air stream is co-mingled with the gas stream by means of the Venturi mixing device 17 so as to provide a combustible gas-air mixture at the burner 18, with the pulverulent material entrained and thoroughly mixed and suspended therein. The combustible gas-air mixture and rate of particle material feed is regulated so that upon ignition at the burner 18 the hottest portion of the flame 19 will be within the plasticizing or softening range of the particle material, but below fusing temperature. The rate of particle material feed is correlated so that the rate of heat absorption of the particles will not be so great as to extinguish combustion at the burner nor to reduce the flame temperature below a desired degree. As an example of suitable flame temperature, the gas-air mixture is regulated so that the hottest part or exterior of flame 19 is about 1,000° C. and the particle material feed rate regulated so that the hottest part of the flame at the burner with the particle material entrained in the combustible mixture is about 900° C.

The glassy volcanic materials do not have either sharp softening or melting points, but rather exhibit ranges. Thus, for example, pellets of volcanic ash were formed in an arbor press, were heated to various temperatures in a Globar furnace. At 1,100° C. there was no evidence of fusion but some sintering had occurred resulting in slight shrinkage of the specimen. At 1,200° C. the beginning of fusion was evident and had progressed considerably at 1,300° C. At 1,400° C. fusion was virtually complete and at 1,450° C. the melt reached a fluid condition. Thus, it may be said that this volcanic ash had a fusing range of between 1,200 and 1,400° C. In accordance with our invention, we prefer to operate well below such fusion range but rather with a softening or plasticizing range, that is for volcanic ash at a flame temperature of below 1,100° C. and above about 800° C., and preferably between 900 and 1,000° C. for best results. It will, of course, be understood that such optimum temperature conditions may vary somewhat with the nature and source of the material being treated, and which may readily be determined by suitable trial.

Thus, in accordance with our invention, as the particle-gas-air mixture leaves the burner 18, it is promptly ignited in the form of a flame 19 which is permitted to project into the receiver or stack 20, composed of refractory material and suitably of rectangular cross-section, through the orifice 21. Although not shown, it will be understood that we may provide a plurality of similar normally projecting and horizontally extending and horizontally spaced burners 18 for discharge into the same receiver. The co-current passage of the particle material through the flame in its pulverulent, disseminated and suspended condition permits rapid and efficient heat transfer and a sudden short or flash action. This prevents sintering or agglomeration and non-uniform heat treatment of the particles as might otherwise occur in other operations such as, for example, the feeding of a stream of particle material into the flame exteriorly of the burner at an angle thereto.

In our process, the treatment of the particle material may be said to be completed in the fraction of a second required for the material to pass through and emerge from the flame. This brief treatment is, however, adequate to plasticize the particles and to suddenly and explosively release the bound water and other formed gases, and to result in expansion and eruption of the particles. At the same time, the high temperature and reducing atmosphere of the gas flame causes the ferric oxide content of the material to be converted to ferrous oxide.

Although the chamber 20 may be defined by fire-brick walls, it is not employed and does not function as a combustion zone or furnace, but rather as a stack or flue, or as a gas expansion zone, the products of combustion becoming rapidly cooled in their upward passage and escape through the vent 21. Thus, as the forced air-gas-particle mixture is ignited and enters the chamber 20, the pressure of the stream is relieved within the chamber 20, the entrained particle material precipitated therefrom, the products of combustion become progressively cooled and exhausted upwardly, and the flame-treated particle material permitted to drop out therefrom by gravity through the hopper 22, which may be of metal for rapid heat transfer and cooling, and carried outwardly by means of the screw conveyor 23 for discharge or transfer for further handling. The time required for passage of the particle material from its entrance at the orifice 21 at the base of the receiver 20 to its discharge through the hopper 22 and into the conveyor 23 is but a matter of a few seconds, such as four or five seconds, and which period is inadequate to cause appreciable surface glazing or annealing and closing of the pores in the expanded particle material, but rather leaves it in a vesiculated friable form of predominately fractured particles. When operating at a flame temperature of 900–1,000° C. in the manner described, the temperature in the chamber 20 at a point directly opposite the flame 19 at a distance of about four feet therefrom has been observed to be below 600° C. and at an adjacent side wall below 450° C., indicating that chamber 20 does not act as a combustion furnace, and that temperatures immediately exterior of the flame are not adequate to cause any glazing, which is insured by the brief residence in and prompt discharge from receiver 20, through the relatively cooler area of the uninsulated metallic hopper 22.

Although not shown, suitable means may be provided for separately recovering any extremely fine and light particles which may be carried upwardly through receiver 20 and out of the vent 21. However, this represents a very minor proportion of the treated material and may be subsequently combined with the material collected from conveyor 23, if desired.

A specimen of Kansas volcanic ash, treated in accordance with the foregoing, was found to be almost pure white, as distinguished from the gray coloring of the untreated material in the dry state, and in the wet condition it had a white or slightly gray appearance which contrasted markedly with the dirty brown color assumed by the original volcanic ash after wetting. The material which originally had a bulk density of 0.69 gram per cc. was found to have been reduced to a bulk density of 0.07 gram per cc. after having been fed through the reducing flame of a gas burner in accordance with our foregoing described process.

The term "bulk density," as employed herein, is determined by shaking and tapping a weighed sample of the material in a graduated cylinder until a constant volume is reached. The apparent density is the weight of a sample in grams divided by the volume of sample in cubic centimeters. If desired, the bulk density of the flame-treated material may be controlled since we have found that such bulk density is directly proportional to the ignition-loss content of the material at the time when it is introduced or passed through the flame. Thus, for example, if the material is introduced to the gas flame without any pretreatment, other than drying, for expelling the free and absorbed moisture, the maximum reduction in bulk density is obtained.

If an intermediate value of bulk density and product character is desired, this may be accomplished by previously heating the particle material slowly to a temperature between 250–450° C. to drive off the desired portion of the bound water, prior to subjecting it to treatment in the manner hereinbefore generally described.

In order to obtain an indication as to whether or not the change in color was actually caused by a change in state in oxidation of the iron, a sample of the treated volcanic ash was analyzed for ferrous oxide. The value of 2.3% FeO was obtained. This is equivalent to 2.6% $Fe_2O_3$. The iron content of the original volcanic ash which contained 1.9% $Fe_2O_3$ and 0.6% FeO is equivalent to 2.7% $Fe_2O_3$ on an ignition-loss-free basis. These values are in satisfactory agreement since cumulative errors may be about up to 0.1%. It may, therefore, be stated that the complete reduction of the ferric oxide in the volcanic ash was obtained by the indicated method of passing the powdered material through a reducing flame of a gas burner and that appreciable alteration in color resulted from such change.

As distinguished from the foregoing, when the volcanic ash material is heated in an oxidizing atmosphere it assumes brick-red color, possibly as a result of a changed state of combination of ferric oxide in the material. Under the reducing conditions prevailing in the burner flame, this red coloration does not develop, but rather any coloring power of the ferric oxide content is removed by conversion to the ferrous state.

In some instances, an increase 20 points in reflectivity was obtained as measured on a Pulfrich photometer. Furthermore, the color balance of the treated material in terms of its red, yellow, green and blue components is much better than that of the original.

Qualitative tests indicated that the scouring properties of the treated volcanic ash had a better cleansing action than the original material which may be attributed to the increased surface area and porosity of the particles, and scouring tests showed improved character, as indicated by the reduced number of strokes required to clean a given area as compared with that of the untreated material.

Although we have particularly described the suitability of the product of our invention for use as a cleansing agent or a component of a cleansing composition, the low density of the expanded material and the structural characteristics thereof, as revealed under the microscope, indicate that it possesses an exceptionally large volume of dead air space, making it eminently suitable as an insulating material which is enhanced by reason of the low thermal conductivity of the material.

The measurement of the thermal conductivity of the expanded volcanic ash from Kansas using, for example, one cubic foot of material having a bulk density of 10 pounds per cubic foot showed a value of 0.35 B. t. u. per hour per square foot per degree F. per inch. These values of density and thermal conductivity are in the range of such loose insulating materials as rock wool and granulated cork.

Thus, for example, a California volcanic ash having an original apparent density of .965 and a loss on ignition content of 7.2% on being subjected to our flame treatment was reduced to an apparent density of 0.052. By first pre-heating this same specimen at 350° C. and subsequently flame-treating it, the product had a density of 0.447. However, in order to obtain satisfactory improvement in physical properties and whiteness in color and for the purposes particularly contemplated, it is preferable to permit an appreciable amount of bound water to remain and to thus obtain an appreciable amount of expansion, since we have found that the greater amount of surface resulting from expansion not only causes increased reflection and refraction of light which aids the color character but the reduction of the ferric oxide to the ferrous state is better effected by more complete opening or expansion of the particle material.

We claim as our invention:

1. A method for the beneficiation of lava ash containing bound water, which comprises abruptly heating it in pulverulent disseminated condition to a plasticating temperature of from 800 to 1100° C. by entraining and dispersing a pulverulent stream thereof in a forced air-combustible gas stream and passing it co-currently in a fraction of a second through a horizontally projecting flame, and promptly collecting it therefrom in shattered particle form.

2. A method for the beneficiation of lava ash containing bound water, which comprises abruptly heating it in pulverulent disseminated condition to a plasticizing temperature of from 900 to 1000° C. by entraining and dispersing a pulverulent stream thereof in a forced air-combustible gas stream and passing it co-currently in a fraction of a second through a horizontally projecting flame, and promptly collecting it therefrom in shattered particle form.

3. The method of treating lava ash containing bound water and ferric oxide to conjointly improve the color character and physical properties thereof, which comprises abruptly heating said material in pulverulent disseminated particle condition to a temperature of 800 to 1100° C. in a reducing atmosphere by entraining and dispersing a pulverulent stream thereof in a forced air-combustible gas stream and passing it co-currently in less than one second through a horizontally projecting flame, and substantially immediately withdrawing the resulting product from the influence of said heating and permitting it to cool in expanded, vesicular, friable, essentially shattered particle form.

4. A method for the beneficiation of lava ash containing bound water, which comprises abruptly heating said material to a plasticizing temperature of from 800 to 1100° C. for a fraction of a second by entraining and dispersing a pulverulent stream thereof in a forced air-combustible gas stream and passing said mixture through a burner and igniting it thereat, precipitating the heated particle mixture from the resulting flame by projecting said flame in a horizontal direction within and adjacent the base of a gas expansion zone and promptly collecting it therefrom in essentially shattered particle form.

5. The method of treating lava ash containing bound water and ferric oxide to improve the color character thereof and to expand it to vesicular, friable, predominately shattered particle form, which comprises heating the material for a fraction of a second at a temperature of from 800 to 1100° C. by entraining and dispersing a pulverulent stream thereof in a forced air-combustible gas mixture while projecting a flame thereof in a horizontal direction into and adjacent the base of a gas expansion zone and perpendicular to a confining wall thereof, to cause the resultant particle material to be immediately precipitated therein, and promptly withdrawing the material from said zone in predominately shattered particle form.

EINAR P. FLINT.
THOMAS C. MILLER.
WILSON F. DOUGLASS.

REFERENCES CITED

The following references are of record in the file of this patent:

UNITED STATES PATENTS

| Number | Name | Date |
|---|---|---|
| 246,690 | Robinson | Sept. 6, 1881 |
| 1,084,175 | Thomas | Jan. 13, 1914 |
| 1,576,547 | Reader | Mar. 16, 1926 |
| 2,306,462 | Moorman | Dec. 29, 1942 |
| 2,421,902 | Neuschotz | June 10, 1947 |
| 2,431,884 | Neuschotz | Dec. 2, 1947 |
| 2,455,666 | Fournier | Dec. 7, 1948 |

OTHER REFERENCES

Compressed Air Magazine, vol. 47, page 6694, 1942.

University of Arizona Bulletin, vol. 15, No. 4, October 1944, page 34.

Perlite, Source of Synthetic Pumice, Bureau of Mines Publication IC7364, August 1946, pages 2 and 3.